Dec. 18, 1951 K. F. WHITTAKER 2,579,103
DUMPING TYPE OF GRASS CATCHER FOR LAWN MOWERS
Filed July 12, 1950 2 SHEETS—SHEET 1

Inventor
KARL F. WHITTAKER
By Smith & Tuck
Attorneys

Dec. 18, 1951      K. F. WHITTAKER      2,579,103
DUMPING TYPE OF GRASS CATCHER FOR LAWN MOWERS
Filed July 12, 1950      2 SHEETS—SHEET 2
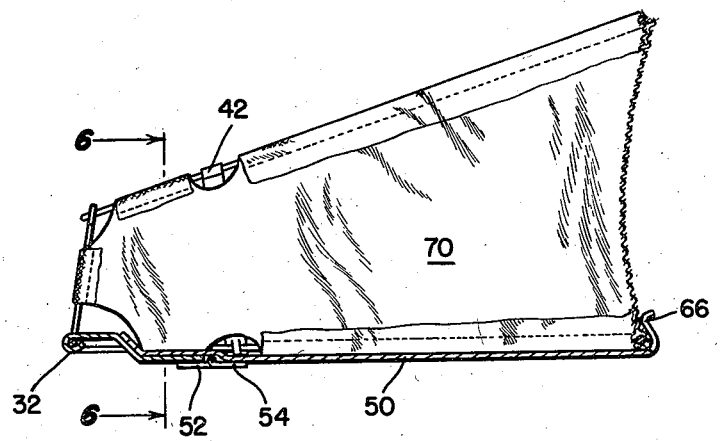
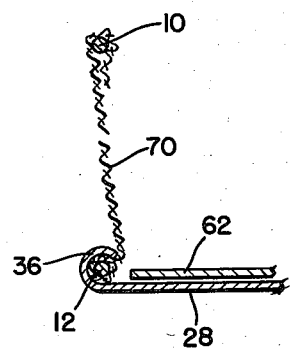
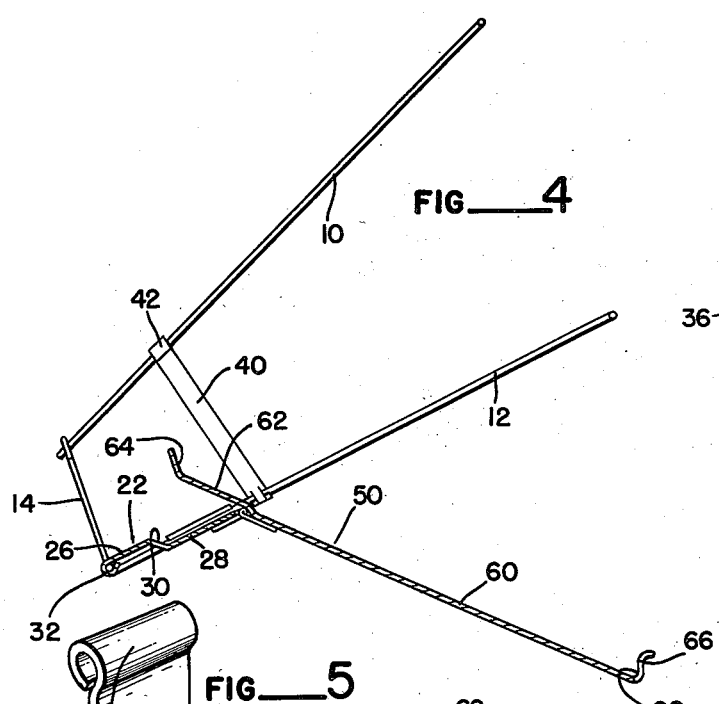
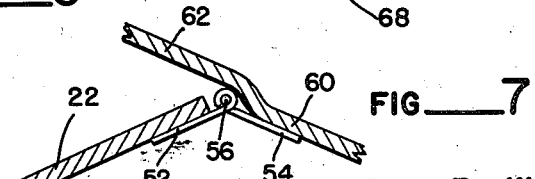
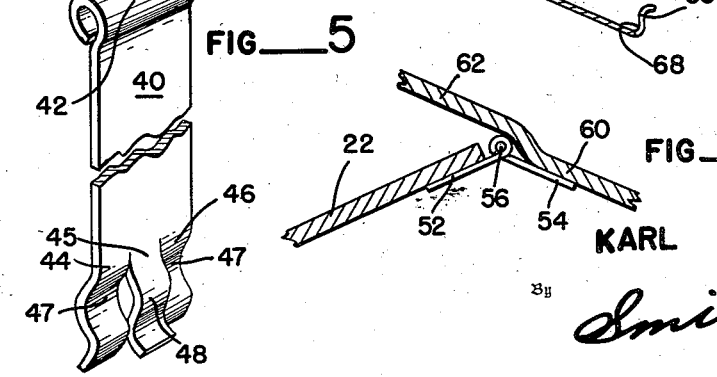
Inventor
KARL F. WHITTAKER
By Smith & Tuck
Attorneys Patented Dec. 18, 1951

2,579,103

UNITED STATES PATENT OFFICE 2,579,103

DUMPING TYPE OF GRASS CATCHER FOR LAWN MOWERS

Karl F. Whittaker, Seattle, Wash.

Application July 12, 1950, Serial No. 173,370

4 Claims. (Cl. 56—200)

My present invention contemplates a grass catcher for attachment to lawn mowers of the revolving sickle bar type in which a D-shaped canvas covered frame is employed which is pivotably secured at its lower forward end to the rear of the lawn mower. Means are provided for spacing the top and bottom frame members of the canvas covered portion of the lawn catcher so that while in use it is substantially a rigid framework. A hinged bottom plate is then provided in the grass catcher which is pivoted rearwardly from its leading edge and is provided with a resilient catch on the rear margin of the bottom plate so that it may be secured to the D-shaped frame while in use but is easily released therefrom and permits the dumping of the collected grass by merely lifting up on the rear of the D-shaped frame and by virtue of the bottom plate covering the entire bottom of the grass catcher a clean thorough dumping of the collected load can be easily achieved.

In the past a large number of various types of grass catchers have been provided for attachment to the rear of a lawn-mower and all of these, to a degree, served their purpose in collecting the cut grass. However, such collections are, in most cases, somewhat difficult to dispose of; the usual means being to lift the catcher entirely off the lawn-mower for such dumping. In some cases the grass must be actually lifted out of the catcher as by the hands. Through the use of my improved construction it is believed that I provide a very satisfactory solution of this formerly distressing problem. With this new structure the grass cuttings can be quickly and easily unloaded from the catcher without any manhandling of the equipment.

The principal object of my present invention, therefore, is to provide a grass catcher for lawn-mowers having a hinged floor so arranged as to greatly facilitate the emptying of the grass that has been collected in a grass mowing operation.

A further object of this invention is to provide a canvas sided grass catcher of more or less conventional form having a metal floor which is hinged rearwardly of its front end to facilitate the emptying of collected grass.

A further object of this invention is to provide a grass catcher having a D-shaped form of body having a floor bar at the leading edge of the catcher so as to provide a rigid tie and attachment member for the same.

A further object of this invention is to provide a grass catcher having a fabric covered frame employing a floor bar at its leading edge and having pivoted to the rear edge of the floor bar a metal floor for the entire grass catcher, with said floor or bottom pivoted rearwardly from its leading edge so that a portion of the bottom will extend over and cover the floor bar of the catcher in normal use.

A further object of this invention is to provide a plurality of spacing struts disposed around the margin of the grass catcher in order to hold the fabric covering of the same taut at all times so that it will function as a unit.

Further objects, advantages and capabilities will be apparent from the description and disclosure in the drawings, or may be comprehended or are inherent in the device.

In the drawings:

Figure 3 is a side elevation of my grass catcher with the same being shown partly in section as though cut by vertical plane passing through the longitudinal axis of the catcher.

Figure 4 is an elevation view in section showing the metal framework of my catcher with the bottom plate released in the dumping position.

Figure 5 is a fragmentary, perspective view showing a typical spacing strut as used with my device.

Figure 6 is a fragmentary, cross-sectional view, in elevation, taken along the lines 6—6 of Fig. 3.

Figure 7 is a fragmentary sectional view, on enlarged scale, showing the bottom plate pivot.

Figure 2:
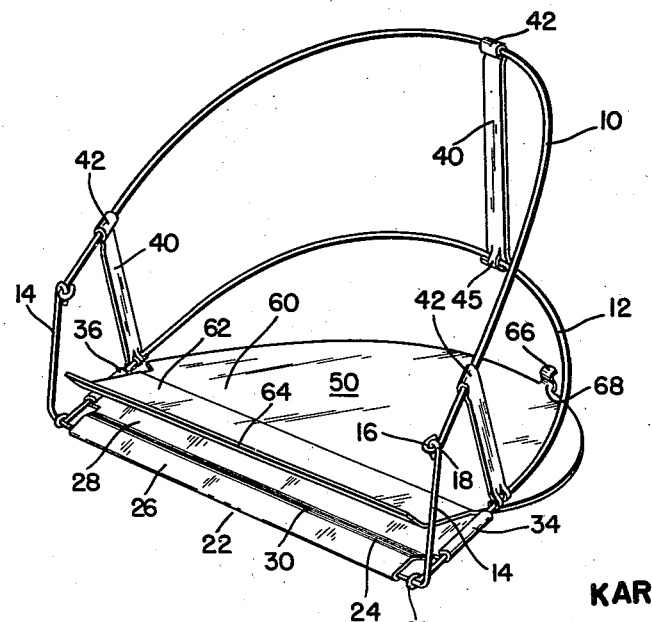
Figure 2 is a perspective view of the metal elements on my grass catcher.

Referring more particularly to the drawings, throughout which like reference characters indicate like parts, the main framework of my grass catcher is formed of three heavy wire members. These consist of the top frame 10, the bottom frame 12 and the connecting frame 14. One satisfactory manner in which these members can be mutually connected is illustrated in Figure 2 in which return bend loops as 16, 18, and 20 are formed on the ends of each of the frame members and these provide for the inter-connecting of the three frame members in such a manner that they can be conveniently folded for compact storage. Considerable stiffness is given to the wire frame assembly, which otherwise is not very rigid, by the floor bar 22. The form of this bar and the manner of using the same is illustrated in Figures 2, 3, and 4. It consists essentially of a flat metal sheet having a downward break at 24 so as to provide two parallel planes as upper plane 26 and lower plane 28 connected by the inclined surface 30. The free margin of surface 26 is rolled over the straight portion of the connecting frame 14 so as to form a firm permanent connection thereto, as at 32. It will be noted in reference to Figure 2 that the edge of plane 26 forming the leading portion of the floor bar is of reduced length so that frame member 14 is available for engagement with the hooks normally supplied on lawn-mowers for convenience in adapting grass catchers to them. The side margins of the larger plane surface 28 is similarly wrapped around, but preferably in reverse direction, the bottom frame 12, as indicated at 34 and 36.

Top frame 10 and bottom frame 12 are spaced and secured in their operative positions with respect to each other by a plurality of spacing strut members 40. These members are preferably formed of metal so that they will have strength in both tension and compression and are wrapped around, preferably, top frame member 10, as at 42. The lower ends of the spacing struts are preferably arranged to yieldably or resiliently engage bottom frame member 12. This can be practically achieved by a double slitting of the end to provide the three tongues 44, 45, and 46. These three tongues are disposed with two of them, the outer ones, being bent in one direction, and with the center tongue bent in the reverse direction so that they will slide over the bottom frame member, and by having them slightly bowed, as at 47 and 48, they form a resilient engagement which can, with some effort, be released from the frame member for use when the device is to be stored away.

Hingedly secured to floor bar 22 is the bottom plate 50. The manner in which this is hingedly connected is illustrated at Figures 3 and 4 wherein hinge member 52 is attached to the floor bar and hinge member 54 is attached to the bottom plate. The hinge pin 56 must be disposed so that the opening action shown in Figures 4 and 7 can be achieved. Bottom plate 50 has a main plane 60, a secondary plane 62 which is parallel to plane 60 and is offset sufficiently to take up the thickness of portion 28 of the floor bar. The extreme forward margin of the bottom plate 50 is bent as at 64 so that it will lie in its working position in firm engagement with the inclined portion 30 of the floor bar. This relationship is illustrated in Figure 3. A resilient latch member 66 is provided either as part of plate 50, or if the metal is not satisfactory for the purpose, a separate element of resilient stock may be used. This latch member is bent, first to make it easy to engage in releasing, and secondly to provide the hollow portion 68 for engagement with bottom frame 12, when the device is in its working position as in Figure 3.

Figure 1:
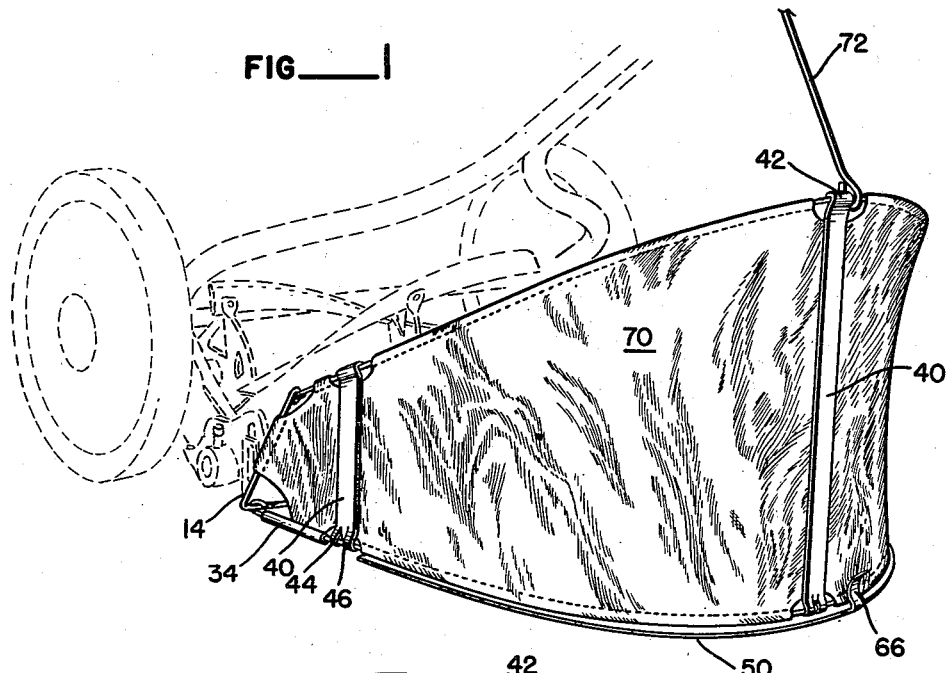
Figure 1 is a perspective view showing a grass catcher made after the teachings of this present invention. The same is shown as attached to a conventional manual lawn-mower which is shown in dashed lines.

The grass catcher is completed by the fabric U-shaped wall 70 which is attached by stitching thereto to the three frame members, after the showing of Figures 1 and 3 and shown in section in Figure 6. A rod or cord 72 is provided for connecting between the upper frame member of the grass catcher and the lawn mower handle as an aid in raising the same when dumping is desired.

In using my grass catcher, it is applied to the lawn mower in the usual manner by engaging the relieved portion of frame 14 on the rearwardly extending hooks of the lawn mower. When the catcher has collected an adequate load of grass cuttings the operator, with the edge of the foot on latch 66, pulls upwardly on the lawn mower handle to which cord 72 is attached releasing the latch member and then continuing the upward movement of the framework of the catcher. The bottom plate rests with its rear or large end 60 on the ground and as the upward effort is applied to the catcher it pivots on pin 56 and the grass cuttings will then slide rearwardly off the plate. This will make a convenient pile of grass cuttings which can be deposited upon the ground or the sidewalk and picked up at the end of the mowing operation when a wheelbarrow or other wheeled container will be available, or they may be deposited upon a small piece of canvas placed under the catcher before the same is released. It is to be noted that the portion of plate 50 forward of pivot 56 insures the dumping of the entire lot of grass cuttings and insures that there will be none left to build up on plane 28 which might interfere with the return of plane 62 to using position again.

It is believed that it will be clearly apparent from the above description and the disclosure in the drawings that the invention comprehends a novel construction of a dumping type of grass catcher for lawn mowers.

Having thus disclosed the invention, I claim:

1. In a grass catcher for lawn mowers of the type having a bottom frame and a dumping bottom plate associated with said bottom frame, the improvement, comprising: a sheet metal floor bar secured at either side to said bottom frame and having its forward edge at the forward end of the grass catcher, said floor bar having a forward upper plane surface, a rear lower plane surface, and an inclined surface connecting said forward and said rear plane surfaces, said upper and lower plane surfaces being substantially parallel; said bottom plate having a main plane surface, a secondary plane surface, and a surface connecting said main and secondary plane surfaces, said secondary plane surface being above, substantially parallel to and forward of said main plane surface, said secondary plane surface overlying said rear lower plane surface when said bottom plate is in closed position, the forward margin of said bottom plate being bent upward so as to overlie said inclined surface of said floor bar when said bottom plate is in closed position, and the rear edge of said floor bar and an adjacent portion of said bottom plate being hingedly connected together.

2. A dumping type of grass catcher for lawn mowers, comprising: a metal framework having a generally U-shaped top frame, a generally U-shaped bottom frame, and a generally U-shaped connecting frame, the free ends of said bottom frame being connected to the base portion of said connecting frame and the free ends of said top frame and said connecting frame being connected together in pairs; a sheet metal floor bar extending between and connecting to opposite arms of said bottom frame by rolling around the same and connected to the base portion of said connecting frame by rolling around the same; strut members extending between and spacing apart said top and bottom frame; fabric walls extending between top and bottom frames; a dumping bottom plate, the forward portion of said dumping bottom plate extending over the rear portion of said floor bar, and the rear edge of said floor bar and an adjacent portion of said bottom plate being hingedly connected together.

3. In a grass catcher for lawn mowers of the type having a bottom frame and a dumping bottom plate associated with said bottom frame, the improvement, comprising: a sheet metal floor bar secured at either side to said bottom frame and having its forward edge at the forward end of the grass catcher, said floor bar having a forward upper plane surface and a rear lower plane surface, said upper and lower plane surfaces being substantially parallel; said bottom plate having a main plane surface and a secondary plane surface, said secondary plane surface being above, substantially parallel to and forward of said main plane surface, said secondary plane surface overlying said rear lower plane surface when said bottom plate is in closed position, and the rear edge of said floor bar and an adjacent portion of said bottom plate being hingedly connected together.

4. A dumping type of grass catcher for lawn mowers, comprising: a metal framework having a top frame and a bottom frame; a sheet metal floor bar secured at either side to said bottom frame and having its forward edge at the forward end of the grass catcher; a dumping bottom plate, the forward portion of said dumping bottom plate being pivotally connected to the rear portion of said floor bar; walls extending between top and bottom frames; and strut members extending between and spacing apart said top and bottom frames, the upper ends of said strut members being secured to said top frame and the lower ends having bowed tongues, a tongue extending on one side of said bottom frame and a tongue extending on the other side.

KARL F. WHITTAKER.

REFERENCES CITED

The following references are of record in the file of this patent:

UNITED STATES PATENTS

| Number | Name | Date |
|---|---|---|
| 355,074 | Given | Dec. 28, 1886 |